United States Patent
Nave et al.

(10) Patent No.: US 11,475,919 B1
(45) Date of Patent: Oct. 18, 2022

(54) EXTENDED AIR GAP DEEP CELLS IN A TAPE LIBRARY

(71) Applicant: International Business Machines Corporation, Armonk, NY (US)

(72) Inventors: Shawn M. Nave, Tucson, AZ (US); Leonard G. Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/480,494

(22) Filed: Sep. 21, 2021

(51) Int. Cl.
*G11B 23/03* (2006.01)
(52) U.S. Cl.
CPC ................................. *G11B 23/0301* (2013.01)
(58) Field of Classification Search
None
See application file for complete search history.

(56) References Cited

U.S. PATENT DOCUMENTS

| 7,477,478 | B2 | 1/2009 | Nave | |
|---|---|---|---|---|
| 7,894,157 | B2 | 2/2011 | Green | |
| 8,265,786 | B2 | 9/2012 | Jesionowski | |
| 11,127,430 | B1* | 9/2021 | Nave | G06F 3/0686 |
| 2008/0231988 | A1* | 9/2008 | Nave | G11B 17/225 360/92.1 |
| 2020/0152241 | A1* | 5/2020 | Nave | G11B 33/1406 |
| 2021/0257005 | A1* | 8/2021 | Nave | G06F 3/0632 |

FOREIGN PATENT DOCUMENTS

| EP | 0620552 A2 * | 10/1994 | ......... G11B 15/6885 |
|---|---|---|---|
| EP | 0627738 A2 * | 12/1994 | .......... G11B 15/682 |
| WO | WO-2007104632 A1 * | 9/2007 | .......... G11B 15/682 |
| WO | WO-2010023269 A1 * | 3/2010 | ......... G11B 15/6885 |

* cited by examiner

*Primary Examiner* — William J Klimowicz
(74) *Attorney, Agent, or Firm* — Maeve M. Carpenter

(57) ABSTRACT

A deep slot cell for providing data storage protection. The deep slot cell includes a front side of the deep slot cell to allow insertion and removal of the plurality of tape cartridges by a robotic mechanism. The data slot cell includes a front air gap at the front side of the deep slot cell that prevents the robotic mechanism from reaching a front-most tape cartridge of the plurality of tape cartridges without manual interaction. The deep slot cell includes a depth side of the deep slot cell with an opening at the depth side of the deep slot cell to accept a pushing tool for manually advancing the rear-most tape cartridge of the plurality of tape cartridges forward toward the front side of the deep slot cell to enable the robotic mechanism to remove the front-most tape cartridge of the plurality of tape cartridges from the deep slot cell.

20 Claims, 9 Drawing Sheets

EXTENDED AIR GAP DEEP CELLS IN A TAPE LIBRARY

BACKGROUND OF THE INVENTION

The present invention relates generally to tape library data protection, and more particularly to tape library deep cell storage technology.

Tape cartridges have traditionally been used for video archives, back-up files, replicas for disaster recovery and retention of information on premise, but the industry is also expanding to off-premise applications in the cloud.

Tape cartridges are usually stored in huge enterprise tape libraries. In order to preserve these tape cartridges, high density tape library frames containing high density (HD) tape cartridge storage slots are utilized, where a single HD tape cartridge storage slot can hold up to five tape cartridges stacked in a row, instead of a single tape to a storage slot. Each tape cartridge in the HD tape cartridge storage slot is referenced with a tier number indicating a position within the HD tape cartridge storage slot, where the tier number increases in a depth direction as more tape cartridges are added to the HD tape cartridge storage slot.

Presently, data security solutions are in high demand. With hackers and cyber-criminals abounding, data security is of paramount importance to clients. Clients need a secure way of storing data that addresses and mitigates concerns related to data theft or misuse. Leveraging tape cartridges as a long-term storage medium is generally viewed as physically secure because there is a physical "air gap". Each tape cartridge that contains client data cannot be accessed unless the tape cartridge is loaded into a tape drive where the data can be read/written. This physical barrier or "air gap" is a major selling point for storing data on tape cartridges when considered against storing data on flash or hard disks that are typically connected to a network, and available "online" where it may be subject to hackers or cyber-criminal activity.

SUMMARY

Aspects of an embodiment of the present invention disclose an apparatus, a method, and a computer system for tape library data protection.

Aspects of an embodiment of the present invention disclose a method for data storage protection. The method includes modifying a deep slot cell configured to house a plurality of tape cartridges. The method includes creating a rear air gap at a depth side of the deep slot cell that enables a robotic mechanism to insert a rear-most tape cartridge of the plurality of tape cartridges into the deep slot cell into a position within the rear air gap. The method includes creating a front air gap at a front side of the deep slot cell that prevents the robotic mechanism from reaching a front-most tape cartridge of the plurality of tape cartridges without manual interaction. The method includes creating an opening at a depth side of the deep slot cell to accept a pushing tool.

Aspects of an embodiment of the present invention disclose an apparatus for providing data storage protection. The apparatus includes a data storage library including a deep slot cell configured to house a plurality of tape cartridges, wherein the deep slot cell comprises. The deep slot cell includes a front side of the deep slot cell configured to allow insertion and removal of the plurality of tape cartridges by a robotic mechanism. The deep slot cell includes a rear air gap at a depth side of the deep slot cell that enables the robotic mechanism to insert a rear-most tape cartridge of the plurality of tape cartridges into the deep slot cell into a position within the rear air gap. The deep slot cell includes a front air gap at the front side of the deep slot cell that prevents the robotic mechanism from reaching a front-most tape cartridge of the plurality of tape cartridges without manual interaction. The deep slot cell includes a depth side of the deep slot cell configured with an opening at the depth side of the deep slot cell to accept a pushing tool for manually advancing the rear-most tape cartridge of the plurality of tape cartridges forward toward the front side of the deep slot cell to enable the robotic mechanism to remove the front-most tape cartridge of the plurality of tape cartridges from the deep slot cell.

DETAILED DESCRIPTION

Figure 1:
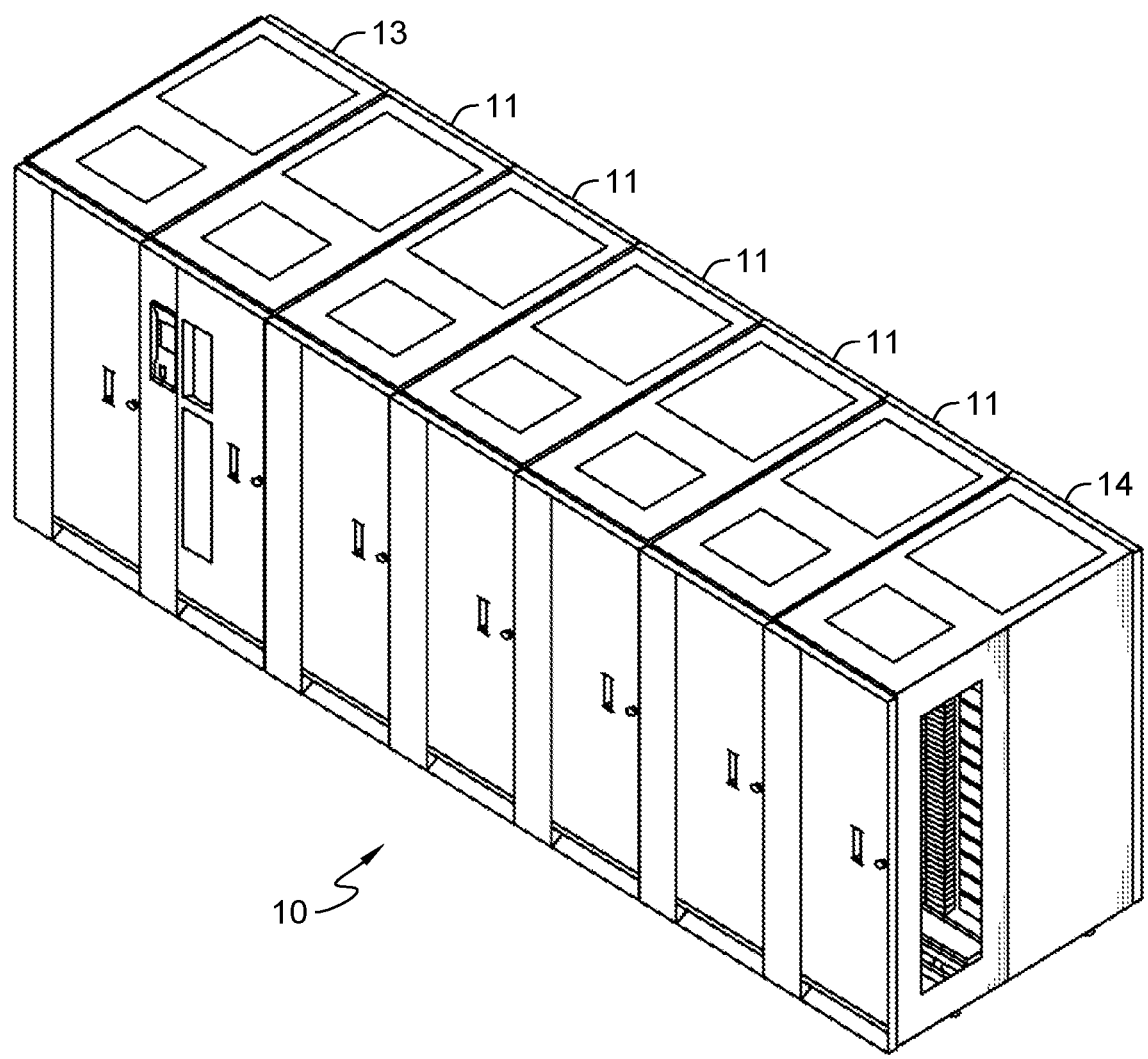
FIG. 1 illustrates a perspective view of a data storage library, in accordance with an embodiment of the present invention.

Embodiments of the present invention recognize that in a tape library storage management environment, even where data is stored on tape cartridges in an automated tape library where a physical "air gap" barrier exists, there may still be data security concerns for a client. For example, a potential concern may be that a malicious hacker could hack into both the tape library as well as a host server and cause a tape cartridge to be mounted into a tape drive where the data on the tape cartridge could be at risk.

Embodiments of the present invention recognize that a known solution for preventing this security exposure is to remove tape cartridges from an automated tape library and lock the tape cartridges in a vault that is completely disconnected from any network. However, this still presents a security exposure, as the tape cartridges can be lost or stolen after removal from the tape library in transit to the vault.

Embodiments of the present invention recognize that there is a security benefit in retaining this "air gap". Embodiments of the present invention recognize a need for a mechanism that enables data to be stored on tape cartridges within an automated tape library more securely, while preserving the benefits of the "air gap".

Embodiments of the present invention provide the capability to take advantage of an inherent feature that exists in a tape library that includes deep cell technology. In tape libraries that include deep cell technology, tape cartridges are stored one behind each other in a tiered lateral layout within deep slot cells. When stored in this way, tape library robotics can only access the tape cartridges located at a frontmost position of a deep slot cell.

Embodiments of the present invention provide the capability to create extended "air gapped" deep slot cells by modifying a rear stop position of tape library data storage cells (i.e., deep slot cells, high-density (HD) storage slots, etc.) to a slightly deeper rear stop position than what is currently used. Embodiments of the present invention provide the capability for tape cartridges being inserted into an extended deep slot storage cell by tape library robotics, such as a tape gripper using a "palm", would stop in a position that is out of reach of the tape gripper "fingers" that are subsequently utilized for tape cartridge removal, thereby adding an additional layer of data security. Embodiments of the present invention provide the capability to require user intervention to physically push the tape cartridges loaded into the extended deep slot storage cell back into a position that is accessible by tape gripper robotic fingers, such that without the user intervention, each extended deep slot storage cell behaves like a one-way street.

Embodiments of the present invention recognize that once a tape cartridge is loaded into an extended "air gapped" deep slot storage cell, it cannot be removed by tape library robotics without a coordinated action by a user to push the tape cartridge(s) to a frontside of the extended "air gapped" deep slot storage cell manually, thereby rendering the tape cartridge inaccessible and secure from hackers that could possibly hack into the tape library and attempt to mount the tape cartridges into a tape drive to access or modify the data.

Embodiments of the present invention recognize that this mechanism preserves all the benefits of traditional tape media storage while adding more robust security and data protections that further insulate client data from malicious hackers and cyber-criminal activity. Additionally, embodiments of the present invention further recognize that utilizing extended "air gapped" deep slot storage cells eliminate potential security concerns associated with transporting tape cartridges away from a tape library, such as transporting into a vault for long-term storage.

Implementation of such embodiments may take a variety of forms, and exemplary implementation details are discussed subsequently with reference to the Figures.

Referring now to various embodiments of the invention in more detail, FIG. 1 is a perspective view that illustrates a data storage library suitable for providing tape library data protection, in accordance with at least one embodiment of the invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In another general embodiment, a system includes a processor and logic integrated with the processor, executable by the processor, or integrated with and executable by the processor. The logic is configured to perform the foregoing method.

In another general embodiment, a computer program product includes one or more computer readable storage media, and program instructions collectively stored on the one or more computer readable storage media. The program instructions include program instructions to perform the foregoing method.

Figure 2:
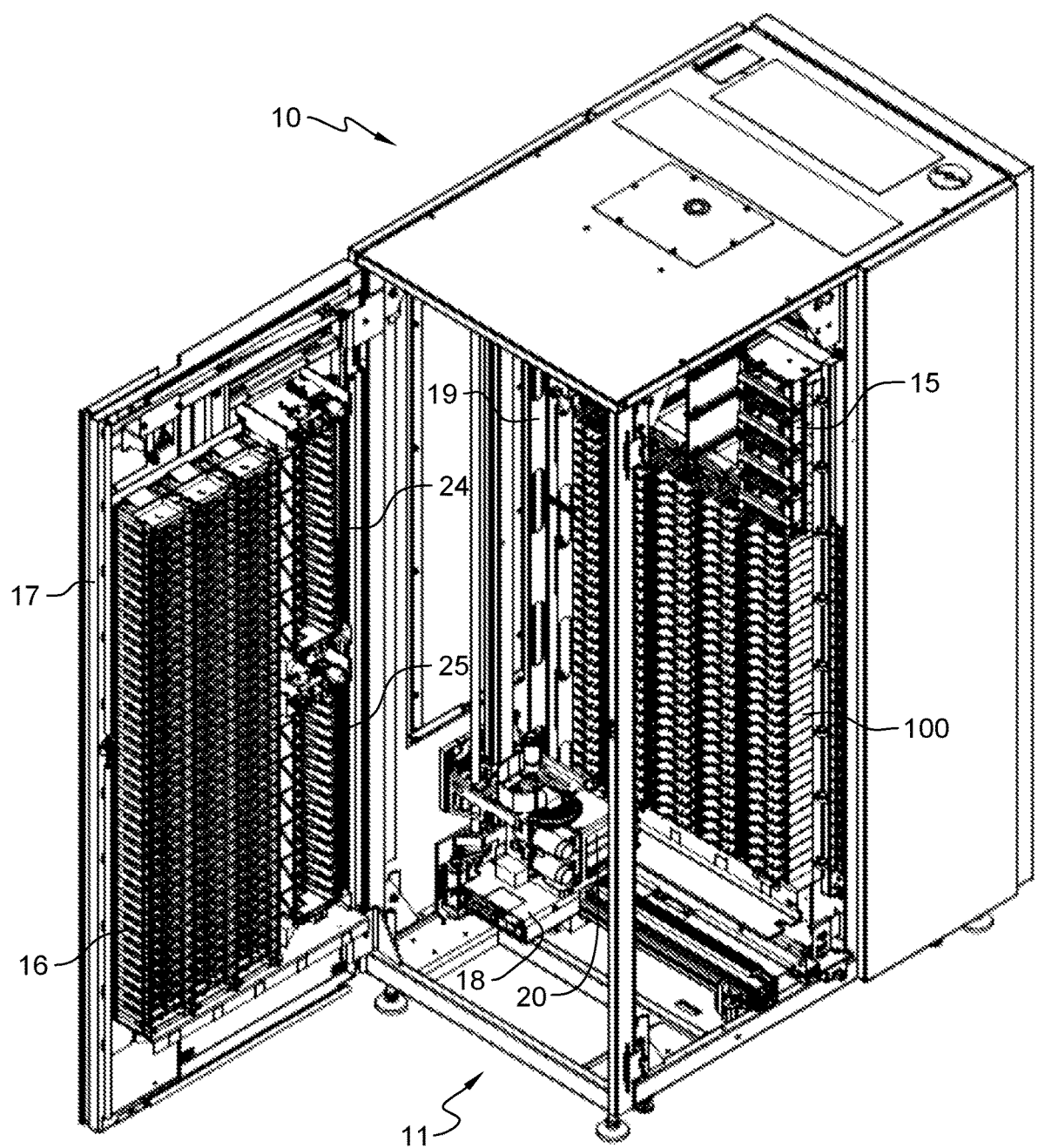
FIG. 2 illustrates a perspective view of a storage frame from the data storage library of FIG. 1, in accordance with an embodiment of the present invention.

FIGS. 1-2 illustrate a data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM® 3584 UltraScalable Tape Library (IBM and all IBM-based trademarks and logos are trademarks or registered trademarks of International Business Machines Corporation and/or its affiliates). Moreover, it should be noted that references to "data storage media" herein refer to data storage cartridges, and for purposes of the present application, the two terms may be used synonymously.

Data storage library 10 of FIG. 1 comprises a left-hand service bay 13, one or more storage frames 11, and right-hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a data storage frame 11, which acts as the base frame of data storage library 10. Moreover, data storage frame 11 illustrated in FIG. 2 is contemplated to be a minimum configuration of data storage library 10, for which there is only a single accessor, such as single accessor 18 (i.e., there are no redundant accessors) and no service bay. However, in other embodiments, a storage frame may include multiple robotic accessors and/or service bays.

Looking to FIG. 2, data storage library 10 is arranged for accessing data storage media in response to commands from at least one external host system (not shown). Data storage library 10 includes a plurality of storage slots, such as single cartridge storage slots 16 on front wall 17 and a plurality of multi-cartridge deep slot cells, such as multi-cartridge deep slot cells 100 on rear wall 19, both of which may be used for storing data storage cartridges that may contain data storage media. According to one approach, the single cartridge storage slots 16 are configured to store a single data storage cartridge, and multi-cartridge deep slot cells 100 are configured to store a plurality of data storage cartridges. In a preferred approach, the multi-cartridge deep slot cells may be arranged in sequential order of tiers from front to rear (e.g., see FIG. 6A and FIG. 7).

With continued reference to FIG. 2, data storage frame 11 of data storage library 10 also includes at least one data storage drive, such as data storage drive 15, e.g., for reading and/or writing data with respect to the data storage media. Additionally, single accessor 18 may be used to transport data storage media between single cartridge storage slots 16, multi-cartridge deep slot cells 100, and/or data storage drive 15. According to various approaches, data storage drive 15 may be optical disc drives, magnetic tape drives, solid state drives having nonvolatile random access memory (NVRAM) such as Flash memory, or other types of data storage drives as are used to read and/or write data with respect to the data storage media.

As illustrated, the data storage frame 11 may optionally include an operator panel or other user interface, such as a web-based interface, which allows a user to interact with the library 10. The data storage frame 11 may also optionally comprise upper I/O station 24 and/or lower I/O station 25, thereby allowing data storage cartridges to be added (e.g., inserted) to the library inventory and/or removed from the library without disrupting library operation. Furthermore, data storage library 10 may have one or more data storage frames, such as data storage frame 11, each having single cartridge storage slots 16, multi-cartridge deep slot cells 100, and/or data storage drive 15, preferably accessible by single accessor 18.

As described above, data storage frame 11 may be configured with different components depending upon the intended function. One configuration of data storage frame 11 may comprise single cartridge storage slots 16, multi-cartridge deep slot cells 100, and/or data storage drive 15, and other optional components to store and retrieve data from the data storage cartridges. However, in another approach, data storage frame 11 may include single cartridge storage slots 16, multi-cartridge deep slot cells 100 and no other components. The single accessor 18 may have gripper assembly 20, e.g., for gripping one or more data storage media, in addition to having a bar code scanner or other reading system, such as a cartridge memory reader or similar system mounted on gripper assembly 20, to "read" identifying information about the data storage media.

FIG. 2 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 2 (and the other FIGS.) should be deemed to include any and all possible permutations.

Data storage library 10 as described in reference to FIGS. 1 and 2, is depicted according to one embodiment. According to the depicted embodiment, the data storage library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Data storage library 10 may have one or more data storage frames 11, left hand service bay 13 and right hand service bay 14. The left-hand service bay 13 may include a first accessor, where, as discussed above, single accessor 18 may include gripper assembly 20 and/or a bar code scanner (e.g., reading system) to "read" identifying information about the data storage media depending on the desired embodiment. Furthermore, right-hand service bay 14 may include a second accessor, which includes a second gripper assembly, and may also include a reading system to "read" identifying information about the data storage media (not shown).

According to one embodiment, in the event of a failure or other unavailability of the single accessor 18, or gripper assembly 20, etc., the second accessor may perform some or all the functions of single accessor 18. Thus in different approaches, the two accessors may share one or more mechanical paths, they may have completely independent mechanical paths, or combinations thereof. In one example, the accessors may have a common horizontal rail with independent vertical rails to travel there along. Moreover, it should be noted that the accessors are described as first and second for descriptive purposes only and this description is not meant to limit either accessor to an association with either left-hand service bay 13, or right-hand service bay 14.

In an exemplary embodiment which is in no way intended to limit the invention, the first and second accessors may preferably move their grippers in at least two directions, called the horizontal "X" direction and vertical "Y" direction, e.g., to retrieve and grip, deliver and release, load and unload, etc. the data storage cartridge at single cartridge storage slots 16, multi-cartridge deep slot cells 100, data storage drive 15, etc.

Data storage library 10 receives commands from one or more host systems (not shown). The host systems, such as host servers, communicate with data storage library 10 directly, e.g., on a path, through one or more control ports (not shown), or through one or more data storage drive 15 on paths. Thus, in different approaches, the host systems may provide commands to access particular data storage cartridges and move the cartridges, for example, between single cartridge storage slots 16 and data storage drive 15. The commands are typically logical commands identifying the cartridges or cartridge media, and/or logical locations for accessing the media. Furthermore, it should be noted that the terms "commands" and "work requests" are used interchangeably herein to refer to such communications from the host system to data storage library 10 as are intended to result in accessing particular data storage media within data storage library 10 depending on the desired approach.

According to one embodiment, data storage library 10 may be controlled by a library controller. Moreover, in various approaches, the library controller may include a distributed control system receiving the logical commands from hosts, determining the required actions, and/or converting the actions to physical movements of the first and/or second accessor. In another approach, the distributed control system may have a plurality of processor nodes, each having one or more computer processors. According to one example of a distributed control system, a communication processor node may be located in data storage frame 11. The communication processor node provides a communication link for receiving the host commands, either directly or through the data storage drive 15, via at least one external interface, e.g., coupled to a line.

In one embodiment, a communication processor node may additionally provide a communication link for communicating with data storage drive 15. The communication processor node may preferably be located in data storage frame 11, e.g., close to data storage drive 15. Furthermore, one or more additional work processor nodes may be provided to form an exemplary distributed processor system, which may comprise, e.g., a work processor node located at first accessor, and that is coupled to the communication processor node via a network. According to different approaches, each work processor node may respond to received commands that are broadcast thereto from any communication processor node, and the work processor nodes may also direct the operation of the accessors, e.g., providing move commands. An XY processor node may be provided and may be located at an XY system of a first accessor. As illustrated, the XY processor node is coupled to the network, and is responsive to the move commands, operating the XY system to position gripper assembly 20.

Also, an operator panel processor node may be provided at an optional operator panel for providing an interface for communicating between the operator panel and the communication processor node, the work processor nodes, and the XY processor nodes.

A network, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node may be coupled to data storage drive 15 of data storage frame 11, via lines, and are thereby communicating with data storage drive 15 and with one or more host systems. Alternatively, the host systems may be directly coupled to the communication processor node, at an input for example, or to control port devices (not shown) which connect the library to the host system(s) with a library interface similar to the drive/library interface. As is known to those of skill in the art, various communication arrangements may be employed for communication with the hosts and with the data storage drives. In one example, host connections are intended to be Ethernet and a SCSI bus, respectively, e.g., and may serve as host connections. However, a bus may comprise an example of a Fibre Channel bus which is a high speed serial data interface, allowing transmission over greater distances than the SCSI bus systems.

According to some approaches, data storage drive 15 may be in close proximity to the communication processor node, and may employ a short distance communication scheme, such as Ethernet, or a serial connection, such as RS-422. Thus, data storage drive 15 may be individually coupled to the communication processor node by one or more lines. Alternatively, data storage drive 15 may be coupled to the communication processor node through one or more networks.

Furthermore, additional storage frames, such as data storage frame 11 may be provided, whereby each is preferably coupled to the adjacent storage frame. According to various approaches, any of the additional storage frames 11 may include communication processor nodes, single cartridge storage slots 16, data storage drive 15, multi-cartridge deep slot cells 100, and one or more networks, etc.

Moreover, as described above, data storage library 10 may comprise a plurality of accessors. A second accessor, for example, may be located in right-hand service bay 14 of FIG. 1. The second accessor may include a gripper assembly, such as gripper assembly 20, for accessing the data storage media, and an XY system for moving the second accessor. The second accessor may run on the same horizontal mechanical path as a first accessor, and/or on an adjacent (e.g., separate) path. Moreover a control system may additionally include an extension network, which forms an additional network coupled to a network of data storage frame 11 and to a network of left-hand service bay 13.

In one embodiment, the first and second accessors are associated with left-hand service bay 13 and right-hand service bay 14 respectively. However, this is for illustrative purposes and there may not be an actual association. Thus, according to another approach, a network may not be associated with left-hand service bay 13, and the network may not be associated with right-hand service bay 14. Moreover, depending on the design of data storage library 10, it may not be necessary to have left-hand service bay 13 and/or right-hand service bay 14 at all.

Data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 3:
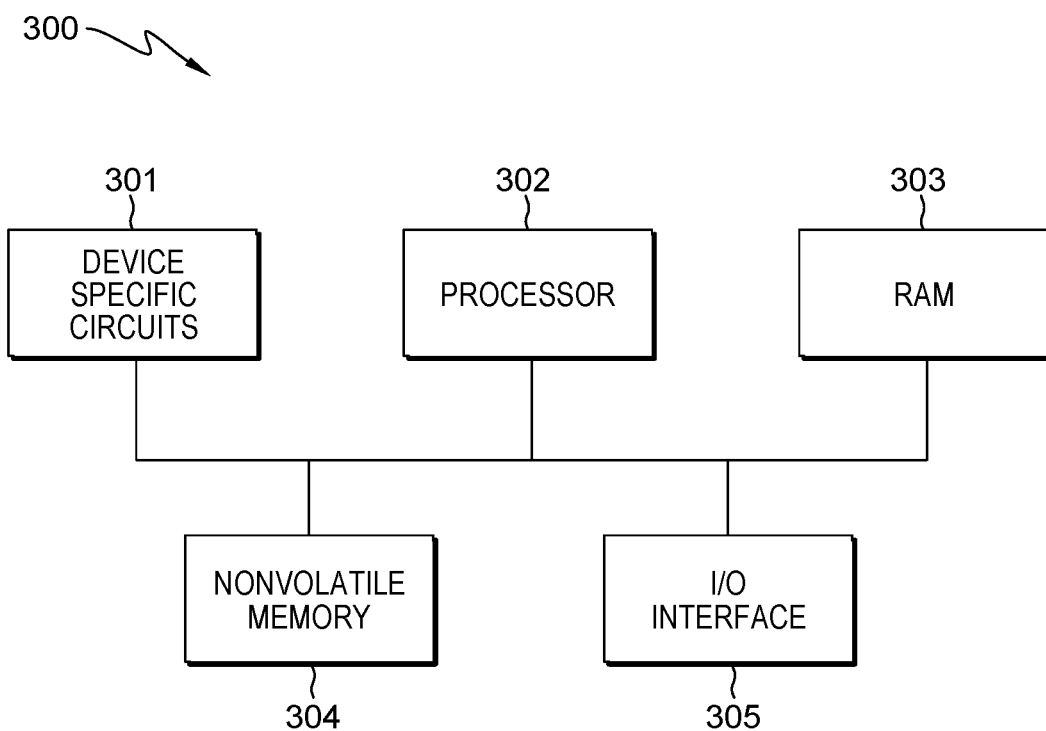
FIG. 3 illustrates a block diagram depicting a controller configuration for the data storage library of FIG. 1, in accordance with an embodiment of the present invention.

Referring now to FIG. 3, a typical controller 300 is shown with a processor 302, Random Access Memory (RAM) 303, nonvolatile memory 304, device specific circuits 301, and I/O interface 305. Alternatively, the RAM 303 and/or nonvolatile memory 304 may be contained in the processor 302 as could the device specific circuits 301 and I/O interface 305. The processor 302 may comprise, for example, an off-the-shelf microprocessor, custom processor, Field Programmable Gate Array (FPGA), Application Specific Integrated Circuit (ASIC), discrete logic, etc. The RAM 303 is typically used to hold variable data, stack data, executable instructions, etc.

According to various approaches, the nonvolatile memory 304 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 304 is typically used to hold the executable firmware and any nonvolatile data. Moreover, the I/O interface 305 comprises a communication interface that allows the processor 302 to communicate with devices external to the controller. Examples may comprise, but are not limited to, serial interfaces such as RS-232, USB (Universal Serial Bus) or Small Computer Systems Interface (SCSI). The device specific circuits 301 provide additional hardware to enable the controller 300 to perform unique functions including, but not limited to, motor control of a cartridge gripper. Moreover, the device specific circuits 301 may include electronics that provide, by way of example but not limitation, Pulse Width Modulation (PWM) control, Analog to Digital Conversion (ADC), Digital to Analog Conversion (DAC), etc. In addition, all or part of the device specific circuits 301 may reside outside the controller 300.

While data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, a communication processor node may comprise the library controller while the other processor nodes (if present) may assist the library controller and/or may provide backup or redundant functionality. In another example, communication processor node and work processor node may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 4A:
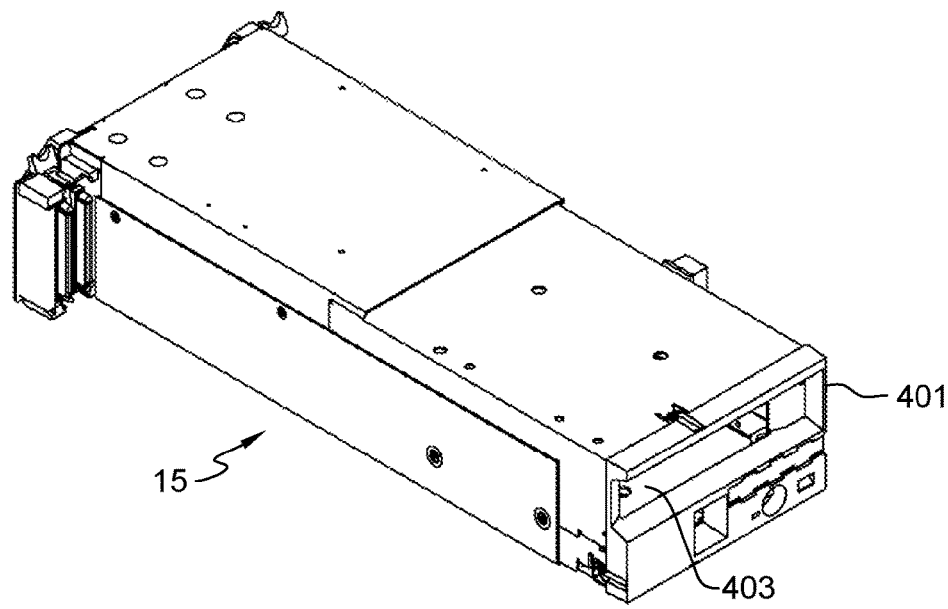
FIG. 4A illustrates a front perspective view of a data storage drive from the data storage library of FIG. 1, in accordance with an embodiment of the present invention.
Figure 4B:
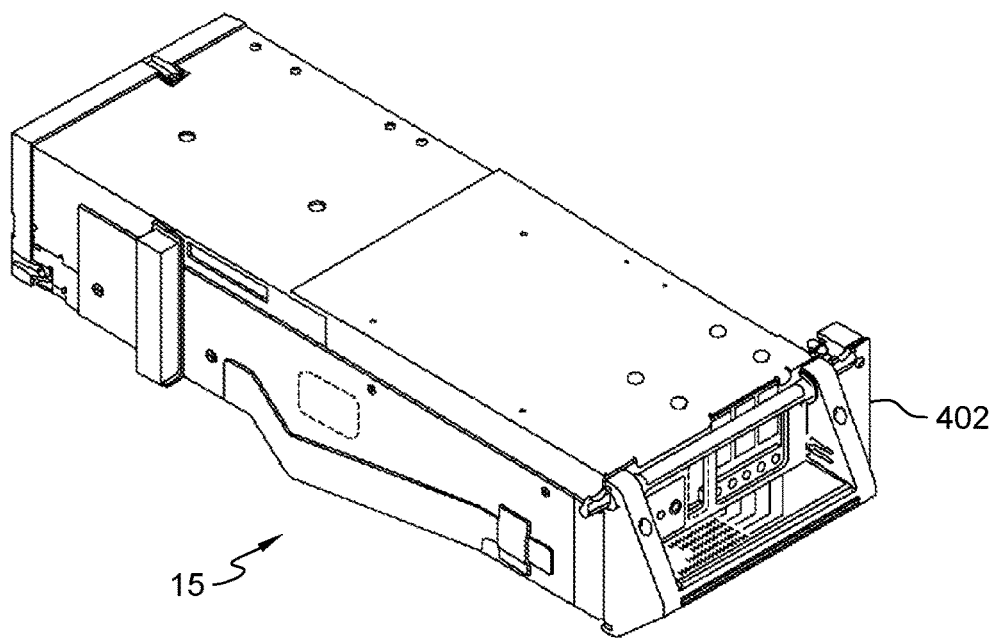
FIG. 4B illustrates a rear perspective view of the data storage drive of FIG. 4A, in accordance with an embodiment of the present invention.

FIGS. 4A-4B illustrate the front 401 and rear 402 views of data storage drive 15, according to one embodiment. In the example depicted in FIGS. 4A-4B, data storage drive 15 comprises a hot-swap drive canister, which is in no way intended to limit the invention. In fact, any configuration of data storage drive may be used whether or not it includes a hot-swap canister. As discussed above, data storage drive 15 is used to read and/or write data with respect to the data storage media, and may additionally communicate with a memory which is separate from the media, and is located within the cartridge. Thus, according to one approach, a data storage cartridge may be placed into data storage drive 15 at opening 403.

Figure 5:
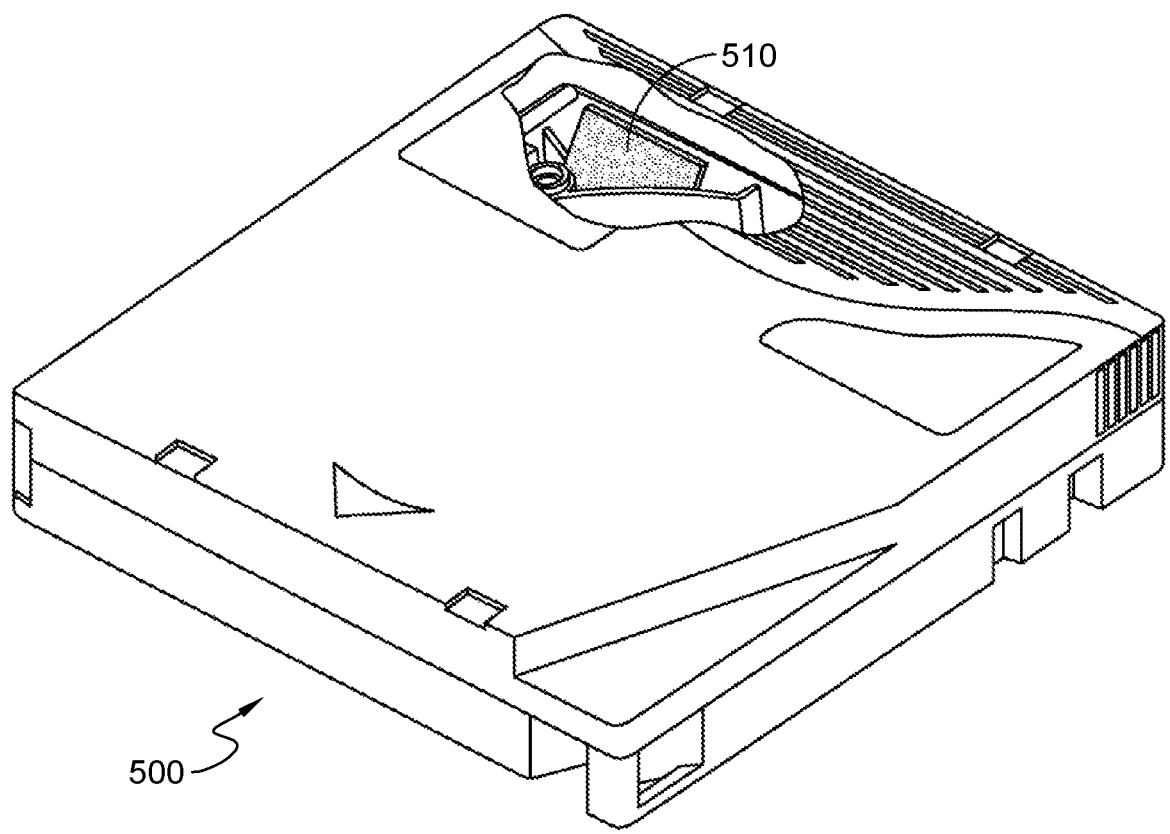
FIG. 5 illustrates a perspective view of a data storage cartridge from the data storage library of FIG. 1, in accordance with an embodiment of the present invention.

Furthermore, FIG. 5 illustrates an embodiment of a data storage cartridge, such as data storage cartridge 500, with a cartridge memory 510 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 6A:
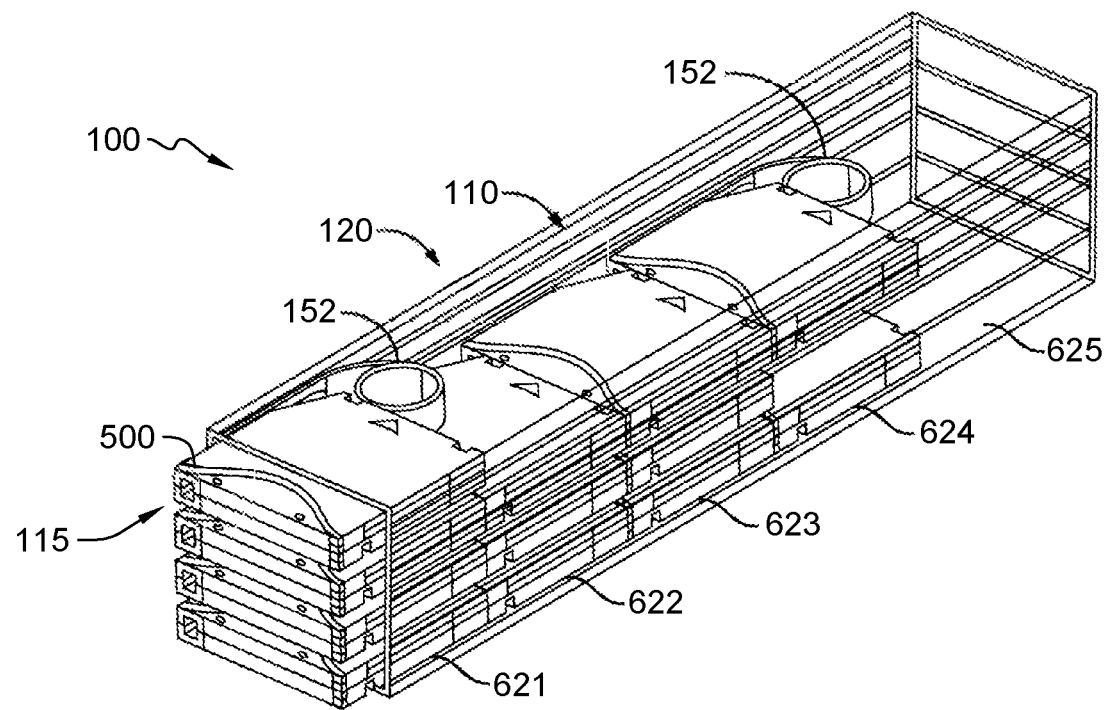
FIG. 6A-6B illustrate perspective views of a multi-cartridge deep slot cell from the data storage library of FIG. 1, in accordance with an embodiment of the present invention.
Figure 6B:
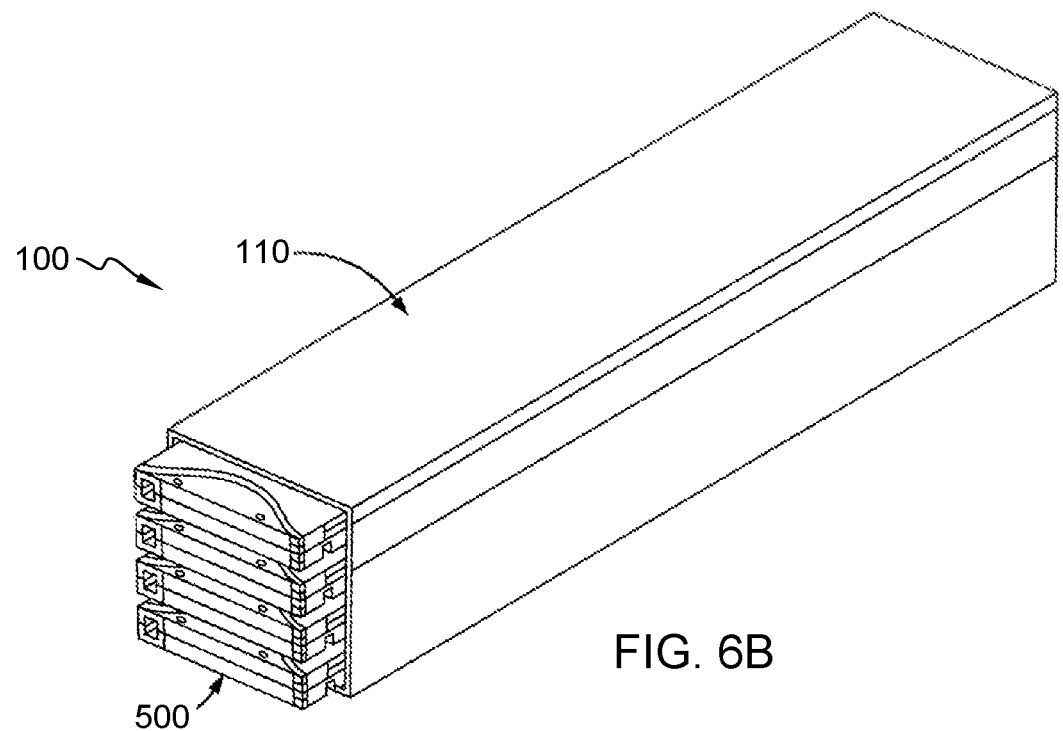

FIGS. 6A-6B illustrate multi-cartridge deep slot cell 100 having biasing springs 152, as depicted according to one embodiment. As shown in the illustrative embodiment, multi-cartridge deep slot cell 100 comprises housing 110 defining an interior space 115. Furthermore, a plurality of storage slots 120 is disposed within the housing and may be configured for storing up to a plurality of data storage cartridges 500, depending on the desired approach. Alternatively, multi-cartridge deep slot cell 100 may be built into the frame of the automated data storage library according to one approach.

Referring to FIGS. 6A-6B, in accordance with one embodiment, storage slots 120 are depicted as being configured for storing up to a plurality of data storage cartridges 500, and arranged in sequential order of tier 621, tier 622, tier 623, tier 624, and tier 625 from front to rear. It should be noted that the frontmost tier 621 is also called "tier 1", while the next tier 622 is called "tier 2", etc., and the last tier 625 is also called "tier 5", or the "rearmost" tier. However, referring to FIG. 2, in one embodiment, single cartridge storage slots 16 are also termed "tier 0". In one embodiment, multi-cartridge deep slot cell 100 is a high density storage slot within a tape library frame, such as data storage frame 11, capable of storing up to five tape cartridges (5x), such as data storage cartridge 500, stacked in a row within a single slot space within the tape library frame. For example, multi-cartridge deep slot cell 100 is a high density storage slot capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, multi-cartridge deep slot cell 100 is capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. However, it should be appreciated that embodiments of the present invention may be practiced with tape library frames having any number of tiered positions within a storage slot.

In one embodiment, multi-cartridge deep slot cell 100 may include a cartridge blocking mechanism having a retaining gate that retains the data storage cartridges, such as data storage cartridge 500, in multi-cartridge deep slot cell 100 according to one embodiment. According to one approach, the retaining gate may be externally attached to multi-cartridge deep slot cell 100, relative to a front opening of multi-cartridge deep slot cell 100, whereby the retaining gate can be activated by an accessor, e.g., of data storage library 10. Moreover, the retaining gate allows for positive cartridge retention against the pressure of biasing springs 152 (see FIGS. 6A-6B) and ensures that one or more data storage cartridges do not get pushed out of multi-cartridge deep slot cell 100 simultaneously, while allowing a pushing mechanism (not shown) of multi-cartridge deep slot cell 100 to continuously push data storage cartridge(s) to the opening in multi-cartridge deep slot cell 100. Thus, according to one approach, the accessor may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of multi-cartridge deep slot cell 100. For example a retaining gate can be lifted by, for example, a gripper assembly, such as gripper assembly 20, or by a front storage cartridge for cartridge removal from/insertion into multi-cartridge deep slot cell 100. Specifically, retaining gate has a pivoting arm mounted on multi-cartridge deep slot cell 100 via a pivoting post that can be integral to a construction of multi-cartridge deep slot cell 100. The pivoting arm is located below a catch of retaining gate whereby a thrust force through data storage cartridge 500 caused by the pushing mechanism of multi-cartridge deep slot cell 100 causes the retaining gate to stay closed in a retaining position. Moreover, the retaining gate is preferably biased such that it closes in the downward direction over the front opening of multi-cartridge deep slot cell 100. This constant biasing may be achieved via gravity, or by implementing a spring force, e.g., attached to the retaining gate.

For removal of a front storage cartridge by a gripper assembly, such as gripper assembly 20, from multi-cartridge deep slot cell 100, the retaining gate must be lifted upward to a releasing position whereby a catch of the retaining gate is disengaged from the front storage cartridge. Once the retaining gate is lifted to the releasing position and the gripper assembly, such as gripper assembly 20, is engaged with a data storage cartridge, such as data storage cartridge 500, the gripper assembly can pull the storage cartridge out of multi-cartridge deep slot cell 100 and into the gripper assembly, such as gripper assembly 20, of the accessor without any interference of the retaining gate.

Once the front storage cartridge is extracted and subsequent data storage cartridges are retained from being pushed out of multi-cartridge deep slot cell 100, the retaining gate has successfully completed its cartridge retrieval process. When a gripper assembly, such as gripper assembly 20, begins to insert storage cartridge back into multi-cartridge deep slot cell 100, the retaining gate is lifted to its releasing position to allow storage cartridges through the front opening of multi-cartridge deep slot cell 100. A catch of the retaining gate interfaces with a rear portion of the storage cartridge, in particular a beveled surface of the catch, whereby the retaining gate is lifted to its releasing position due to the storage cartridge being pushed into multi-cartridge deep slot cell 100 by the gripper assembly, such as gripper assembly 20. In doing so, data storage cartridges are pushed deeper into multi-cartridge deep slot cell 100 by the first storage cartridge in multi-cartridge deep slot cell 100 by the gripper assembly, such as gripper assembly 20. Thus, the gripper assembly, such as gripper assembly 20, can provide a force greater than the thrust force antiparallel thereto, to overcome the directional biasing of the storage cartridges. Upon full insertion into multi-cartridge deep slot cell 100, the retaining gate moves to its retaining position to engage the storage cartridge.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

In one embodiment, one or more data storage cartridges may be added into data storage library 10, e.g., at an I/O station, whereby the controller of data storage library 10 may then operate single accessor 18 to transport the data storage cartridge(s) to a specific multi-cartridge deep slot cell 100 and place the data storage cartridge(s) therein. Similarly, the controller may operate single accessor 18 to selectively extract, place and transport data storage cartridges with respect to single cartridge storage slots 16, and/or transport inserted or added cartridge(s) to specific single cartridge storage slots 16.

Figure 7:
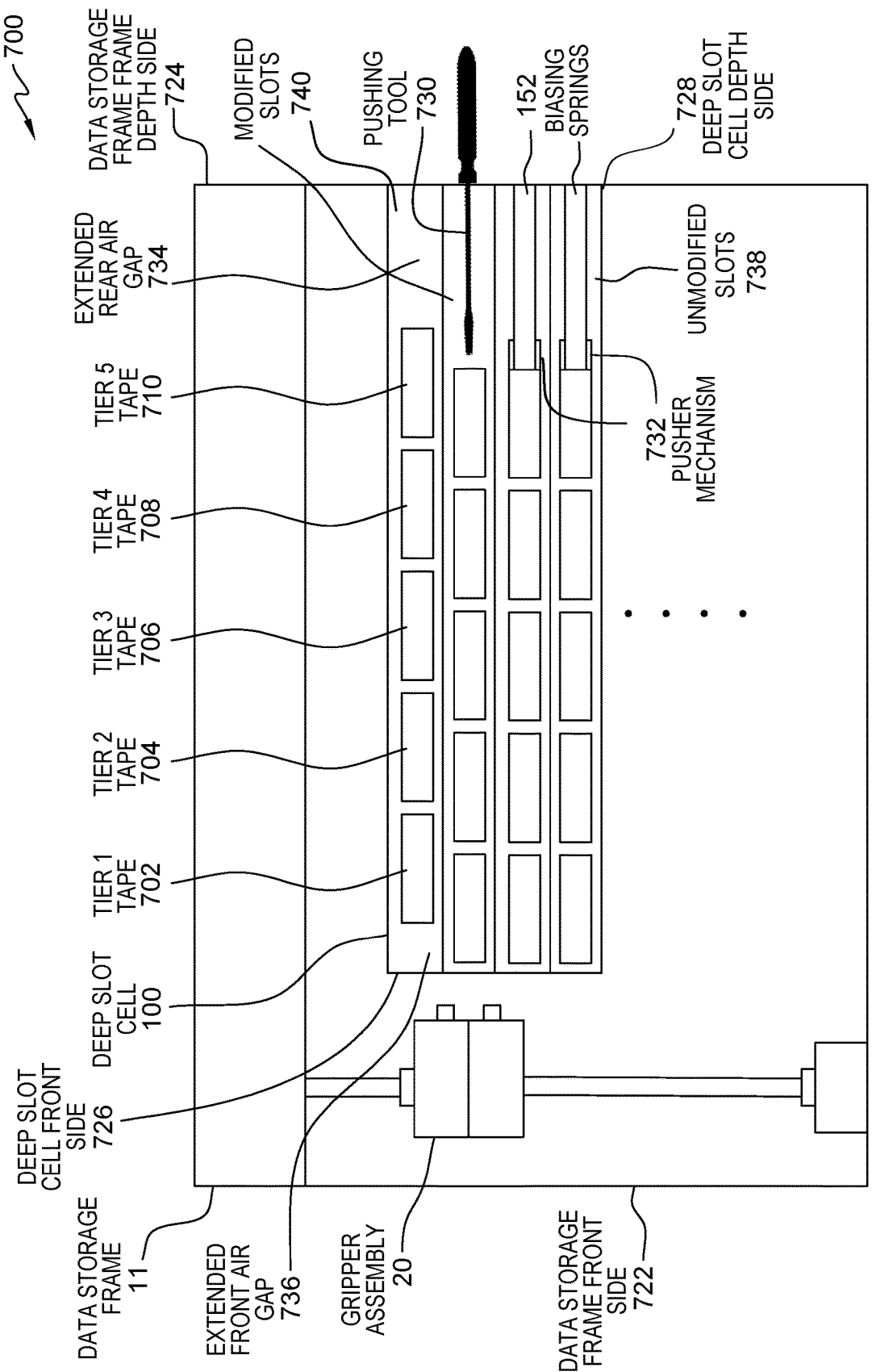
FIG. 7 illustrate a side perspective view of the data storage library of FIG. 1 including the multi-cartridge deep slot cell of FIG. 6A-6B with an extended air gap feature, in accordance with an embodiment of the present invention.

FIG. 7 illustrates a side perspective view, generally designated 700, of data storage frame 11 including at least one multi-cartridge deep slot cell 100 having an extended air gap feature and a tape gripper assembly, such as gripper assembly 20. In the illustrative embodiment, data storage frame 11 includes a plurality of high density storage slots, such as multi-cartridge deep slot cell 100. In one embodiment, multi-cartridge deep slot cell 100 is oriented within data storage frame 11 such that deep slot cell front side 726 is facing data storage frame front side 722, and the deep slot cell depth side 728 is facing data storage frame depth side 724. For illustrative purposes, four deep slot cells are depicted in order to provide comparison between a set of two unmodified deep slot cells, such as unmodified slots 738, to a set of two modified deep slot cells, such as modified slots 740.

In one embodiment, the multi-cartridge deep slot cell, such as deep slot cell 100, includes a plurality of tape cartridges, such as tier 1 tape 702, tier 2 tape 704, tier 3 tape 706, tier 4 tape 708, and tier 5 tape 710, each stored in a tiered lateral layout orientation beginning with tier 1 tape 702 located in a tier 1 position, such as tier 621 of FIG. 6A, at deep slot cell front side 726 of deep slot cell 100, and ending with tier 5 tape 710 located in a tier 5 position, such as tier 625 of FIG. 6A, at deep slot cell depth side 728 of deep slot cell 100.

A spring mechanism, such as biasing springs 152, is integrated into a pusher mechanism of deep slot cell 100, such as pusher mechanism 732, and together, biasing springs 152 and pusher mechanism 732 apply a spring tension force to a plurality of tape cartridges loaded within deep slot cell 100, such as tier 1 tape 702, tier 2 tape 704, tier 3 tape 706, tier 4 tape 708, and tier 5 tape 710, each stored at, for example, tier 621, tier 622, tier 623, tier 624, and tier 625 of FIG. 6, to move the plurality of tape cartridges forward in a lateral direction towards deep slot cell front side 726 for access by the tape library robotics of data storage frame 11, such as gripper assembly 20. In one embodiment, as illustrated in FIG. 7, a set of two unmodified deep slot cells are shown, such as unmodified slots 738, each including a respective biasing springs 152 and pusher mechanism 732 to facilitate normal loading and unloading of a plurality of tape cartridges from a deep slot cell, such as deep slot cell 100, and a set of two modified deep slot cells are shown, such as modified slots 740, each having a respective biasing spring, such as biasing springs 152, and a pusher mechanism, such as pusher mechanism 732, removed from the multi-cartridge deep slot cells to create an extended front air gap and an extended rear air gap, such as extended front air gap 736 and extended rear air gap 734.

It should be understood that although FIG. 7 depicts a set of two modified multi-cartridge deep slot cells, such as modified slots 740, and a set two unmodified multi-cartridge deep slot cells, such as unmodified slots 738, for brevity, embodiments of the present invention may be similarly practiced in any combination of multi-cartridge deep slot cells within a data storage frame, up to a maximum physical capacity within a data storage frame. For example, a data storage frame may include only one modified multi-cartridge deep slot cell along with a plurality of unmodified multi-cartridge deep slot cells, each of the multi-cartridge deep slot cells may be modified, or any combination of the plurality of multi-cartridge deep slot cells may be modified.

In one embodiment, a multi-cartridge deep slot cell, such as deep slot cell 100 includes a physical modification within a housing of multi-cartridge deep slot cell 100 that provides robust data protection for each of a plurality of tape cartridges stored on a depth side of multi-cartridge deep slot cell 100. In one embodiment, multi-cartridge deep slot cell 100 includes a physical modification integrated into a housing of multi-cartridge deep slot cell 100 that prevents a tape library robotic mechanism, such as gripper assembly 20 of data storage library 10, from removing any tape cartridge, such as data storage cartridge 500, stored within multi-cartridge deep slot cell 100 without coordinated manual assistance. In one embodiment, the physical modification within the housing of multi-cartridge deep slot cell 100 includes removing at least the spring mechanism, such as biasing springs 152, from the housing of multi-cartridge deep slot cell 100. In an alternative embodiment, the physical modification within the housing of multi-cartridge deep slot cell 100 includes removing the spring mechanism, such as biasing springs 152, and the pusher mechanism, such as pusher mechanism 732, from the housing of multi-cartridge deep slot cell 100. In yet another embodiment, the physical modification within the housing of multi-cartridge deep slot cell 100 may include rendering the spring mechanism, such as biasing springs 152, and the pusher mechanism, such as pusher mechanism 732, inoperable by eliminating or detaching a mechanical connection from a mechanical anchor point within the housing of multi-cartridge deep slot cell 100.

In one embodiment, with the spring mechanism, such as biasing springs 152, removed from multi-cartridge deep slot cell 100, a tape cartridge, such as tier 1 tape 702, located at a tier 1 position, such as tier 621 of FIG. 6A, at the front of the deep slot cell, such as deep slot cell front side 726, would not be capable of being successfully grabbed by a gripper assembly, such as gripper assembly 20, due to the creation of extended front air gap 736. For example, a theoretically "hacked" library could attempt to grab the tape cartridge, but it would fail the move, and the fingers of the gripper assembly, such as gripper assembly 20, would not successfully latch onto the tape cartridge because the spring mechanism of the deep slot cell would not keep the tape cartridge pushed into the front of the deep slot cell where the gripper assembly, such as gripper assembly 20, could successfully grab the tape cartridge.

In one embodiment, removing the spring mechanism, such as biasing springs 152, from multi-cartridge deep slot cell 100 creates two extended air gapped areas within the house of multi-cartridge deep slot cell 100, extended front air gap 736 and extended rear air gap 734. In one embodiment, extended front air gap 736 and extended rear air gap 734 provide "air gaps" within the housing of multi-cartridge deep slot cell 100 that allow a plurality of tape cartridges, such as tier 1 tape 702, tier 2 tape 704, tier 3 tape 706, tier 4 tape 708, and tier 5 tape 710, to be positioned deeper into multi-cartridge deep slot cell when being loaded by a gripper assembly, such as gripper assembly 20. In one embodiment, a gripper assembly, such as gripper assembly 20, generates enough thrust force at the "palm" during loading operations to push a tape cartridge into multi-cartridge deep slot cell 100 far enough within the housing to create extended front air gap 736 and render the tape cartridge inaccessible once it is loaded. In one embodiment, the distance (i.e., length) of extended front air gap 736 from deep slot cell front side 726 into the housing of multi-cartridge deep slot cell 100 is determined at least by a thrust force generated by gripper assembly 20 during loading operations.

In one embodiment, extended rear air gap 734 creates an extended interior space within multi-cartridge deep slot cell 100 to shift each of the plurality of tapes, such as tier 1 tape 702, tier 2 tape 704, tier 3 tape 706, tier 4 tape 708, and tier 5 tape 710, deeper into the housing towards deep slot cell depth side 728, and an access space to reach the rear-most tape cartridge in multi-cartridge deep slot cell 100 from deep slot cell depth side 728 with a pushing tool, such as pushing tool 730. In one embodiment, the access space is an opening or orifice integrated within multi-cartridge deep slot cell 100 configured to accept a pushing tool, such as pushing tool 730, for manually advancing a plurality of stored tape cartridges forward within multi-cartridge deep slot cell 100. In one embodiment, the access space can be any geometric shape of any size, including, but not limited to, a circle opening, an oval opening, a square opening, a rectangle opening, etc., capable of receiving a pushing tool, such as pushing tool 730. In an alternative embodiment, the access space may be machined into multi-cartridge deep slot cell 100 and can be similarly machined into a rear door of multi-cartridge deep slot cell 100 to provide the capability to receive a pushing tool, such as pushing tool 730, from a depth side of the data storage frame, such as data storage frame depth side 724. In one embodiment, extended rear air gap 734 creates an open-air space where a user, from the deep slot cell depth side 728, can insert a tool into the opening integrated within the housing of multi-cartridge deep slot cell 100 from deep slot cell depth side 728 to manually advance each of the plurality of tape cartridges forward within the housing towards gripper assembly 20 at deep slot cell front side 726. For example, when a tape cartridge is loaded (i.e., stored within) an extended air gapped deep slot cell, additional coordinated user interaction is required to appropriately remove the tape cartridge from the extended air gapped deep slot cell. In this example, where the tape cartridge is to be removed from an extended air gapped deep slot cell, a user operator would receive an alert from a host computer, locate the data storage frame where the tape cartridge is stored, open up a rear door of the data storage frame, locate the appropriate extended air gapped deep slot cell from the back of the data storage frame, and using a pushing tool, such as pushing tool 730, insert pushing tool 730 into an opening integrated into the depth side of the deep slot cell to push (i.e., advance) a rear-most tape cartridge forward and hold the stack of tape cartridges in the extended air gapped deep slot cell to the front of the extended air gapped deep slot cell until the data storage frame receives a command for gripper assembly to locate to the extended air gapped deep slot cell and grab the tape cartridge to mount it into a tape drive. In this example, with the user providing the action of the missing spring mechanism using the pushing tool, such as pushing tool 730, the operation is very secure, as the operation requires a coordinated effort between a local user operator and the data storage library controls.

Further, geometry of existing deep slot cells does not allow for a tape cartridge to be removed from the rear of a data storage frame, such as data storage frame 11. For example, since tape cartridges will not physically fit out of the back side of the deep slot cell, eliminating or rendering inoperable a spring mechanism of a deep slot cell, such as biasing springs 152 of multi-cartridge deep slot cell 100, mitigates any threats of data loss or data theft by human interaction directly with the data storage frame. However, as discussed above, there is space available to insert a pushing tool, such as pushing tool 730, which can be used to manually advance one or more tape cartridges within the deep slot cell for appropriate removal by a gripper assembly, such as gripper assembly 20.

In one embodiment, a pushing tool, such as pushing tool 730, is a simple physical hand tool, such as a long screwdriver, a pool cue, length of rebar, etc., that has an overall fixed length greater than or equal to a dimension of a multi-cartridge deep slot cell, such as multi-cartridge deep slot cell 100, as measured from deep slot cell depth side 728 to deep slot cell front side 726. For example, the pushing tool, such as pushing tool 730, has a length at least equal to a dimension of the deep slot cell, such as deep slot cell 100, as measured from the front side of the deep slot cell, such as deep slot cell front side 726, to the depth side of the deep slot cell, such as deep slot cell depth side 728. In one embodiment, pushing tool 730 may be a telescoping pushing tool capable of extending and locking out at a length sufficient to span the length of a multi-cartridge deep slot cell. In one embodiment, pushing tool 730 may be a specifically designed pushing tool with a handle and tip that will not damage or mark a tape cartridge or a pusher mechanism within the multi-cartridge deep slot cell as it pushes against them.

In one embodiment, as illustrated in FIG. 7, a set of two modified deep cell slots, such as modified slots 740, are shown, each having respective biasing springs 152 and pusher mechanism 732 removed from within a housing of a deep slot cell, such as deep slot cell 100. In one embodiment, removing biasing springs 152 and pusher mechanism 732 from deep slot cell 100 creates extended front air gap 736 and extended rear air gap 734 within the housing of deep slot cell 100, as shown in the set of two modified deep slot cells, such as modified slots 740. Each of the two modified deep slot cells, such as modified slots 740, show a different state of operation including, but not limited to, a blocked state, where the one or more tape cartridges, such as tier 1 tape 702, tier 2 tape 704, tier 3 tape 706, tier 4 tape 708, and tier 5 tape 710, are stored within deep slot cell 100 behind extended front air gap 736, where extended front air gap 736 provides data protection to the one or more tape cartridges within deep slot cell 100 by preventing a gripper assembly, such as gripper assembly 20, from accessing the one or more tape cartridges without manual user interaction, and an access state, where a user is beginning to advance the one or more tape cartridges, such as tier 1 tape 702, tier 2 tape 704, tier 3 tape 706, tier 4 tape 708, and tier 5 tape 710, forward within deep slot cell 100 utilizing a pushing tool, such as pushing tool 730, toward deep slot cell front side 726 for removal by a gripper assembly, such as gripper assembly 20.

In one embodiment, a number and location of extended air gapped deep slot cells within a data storage library (i.e., a tape library) can vary based, at least in part, on requirements of a tape library customer. In one embodiment, as few as one, or as many as every deep slot cell in a data storage frame (i.e., a tape library frame) of a tape library can be configured as an extended air gapped deep slot cell by removing or rendering inoperable a spring mechanism and/or pushing mechanism integrated within the deep slot cell. In one embodiment, a number of tape cartridges that can be stored in an extended air gapped deep slot cell can vary from a single tape cartridge up to four or five tape cartridges deep. For example, where a deeper tape cartridge, such as a tier 4 tape cartridge, needed to be removed from an extended air gapped deep slot cell, a human operator would need to push the stack of tape cartridges using a pushing tool, such as pushing tool 730, to the front of the deep slot cell for each successive tape cartridge retrieval by the tape library robotics (e.g., a gripper assembly, such as gripper assembly 20, until the desired tape cartridge is retrieved.

In one embodiment, extended air gapped deep slot cells provide a very secure way of storing data on a tape cartridge within a tape library, and extended air gapped deep slot cells can be incorporated along with many traditional security measures of a tape library such as physical locking, electronic monitoring of door open/closes and physical inventory of cartridges, to provide the added benefit of eliminating any risks associated with malicious hacking into control of the tape library robotics to gain access to tape cartridges located in the extended air gapped deep slot cells.

Figure 8:
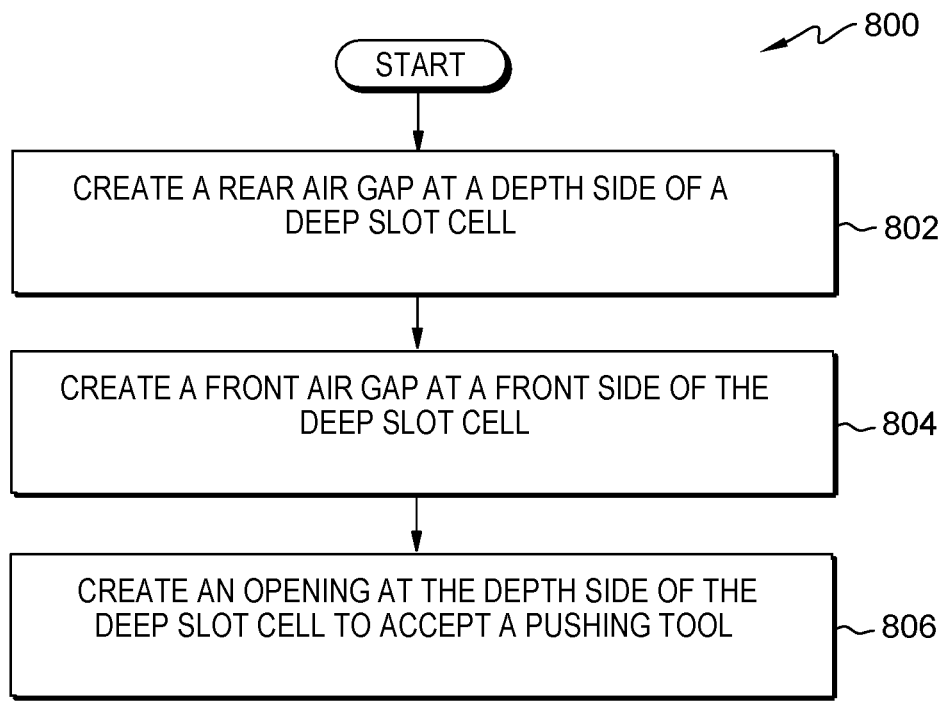
FIG. 8 illustrates a flowchart depicting steps for providing data storage protection, in accordance with an embodiment of the present invention.

FIG. 8 illustrates a flowchart, generally designated 800, depicting steps for providing data storage protection, in accordance with an embodiment of the present invention. In one embodiment, the method for providing data storage protection includes steps for modifying a deep slot cell, such as deep slot cell 100, wherein the steps for modifying the deep slot cell include creating a rear air gap at a depth side of the deep slot cell (802), creating a front air gap at a front side of the deep slot cell (804), and creating an opening at the depth side of the deep slot cell to accept a pushing tool (806).

In one embodiment, creating a rear air gap at a depth side of the deep slot cell (802) includes removing at least a spring mechanism from a housing of the deep slot cell. For example, creating a rear air gap, such as extended rear air gap 734, at a depth side of the deep slot cell, such as deep slot cell depth side 728, includes removing at least a spring mechanism, such as biasing springs 152, from the housing of the deep slot cell, such as deep slot cell 100, as illustrated by modified slots 740 of FIG. 7.

In one embodiment, creating a front air gap at a front side of the deep slot cell (804) includes removing at least a spring mechanism from a housing of the deep slot cell and loading at least one tape cartridge into the housing of the deep slot cell. For example, creating a front air gap, such as extended front air gap 736, at a front side of the deep slot cell, such as deep slot cell front side 726, includes removing at least a spring mechanism, such as biasing springs 152, from the housing of the deep slot cell, such as deep slot cell 100, as illustrated by modified slots 740 of FIG. 7, and loading at least one tape cartridge, such as tier 1 tape 702, into the housing of deep slot cell 100 utilizing a gripper assembly, such as gripper assembly 20.

In one embodiment, creating an opening at the depth side of the deep slot cell to accept a pushing tool (806) includes modifying the housing of the deep slot cell by integrating an aperture at the depth side of the deep slot cell to receive the pushing tool from the depth side of the deep slot cell. For example, creating the opening at the depth side of the deep slot cell, such as deep slot cell depth side 728, includes machining the aperture into the housing of the deep slot cell, such as deep slot cell 100, where the aperture is sized to accept the pushing tool, such as pushing tool 730, for manually advancing one or more tapes, such as tier 1 tape 702, tier 2 tape 704, tier 3 tape 706, tier 4 tape 708, and tier 5 tape 710, to a front side of the deep slot cell, such as deep slot cell front side 726, for removal by a gripper assembly, such as gripper assembly 20.

Figure 9:
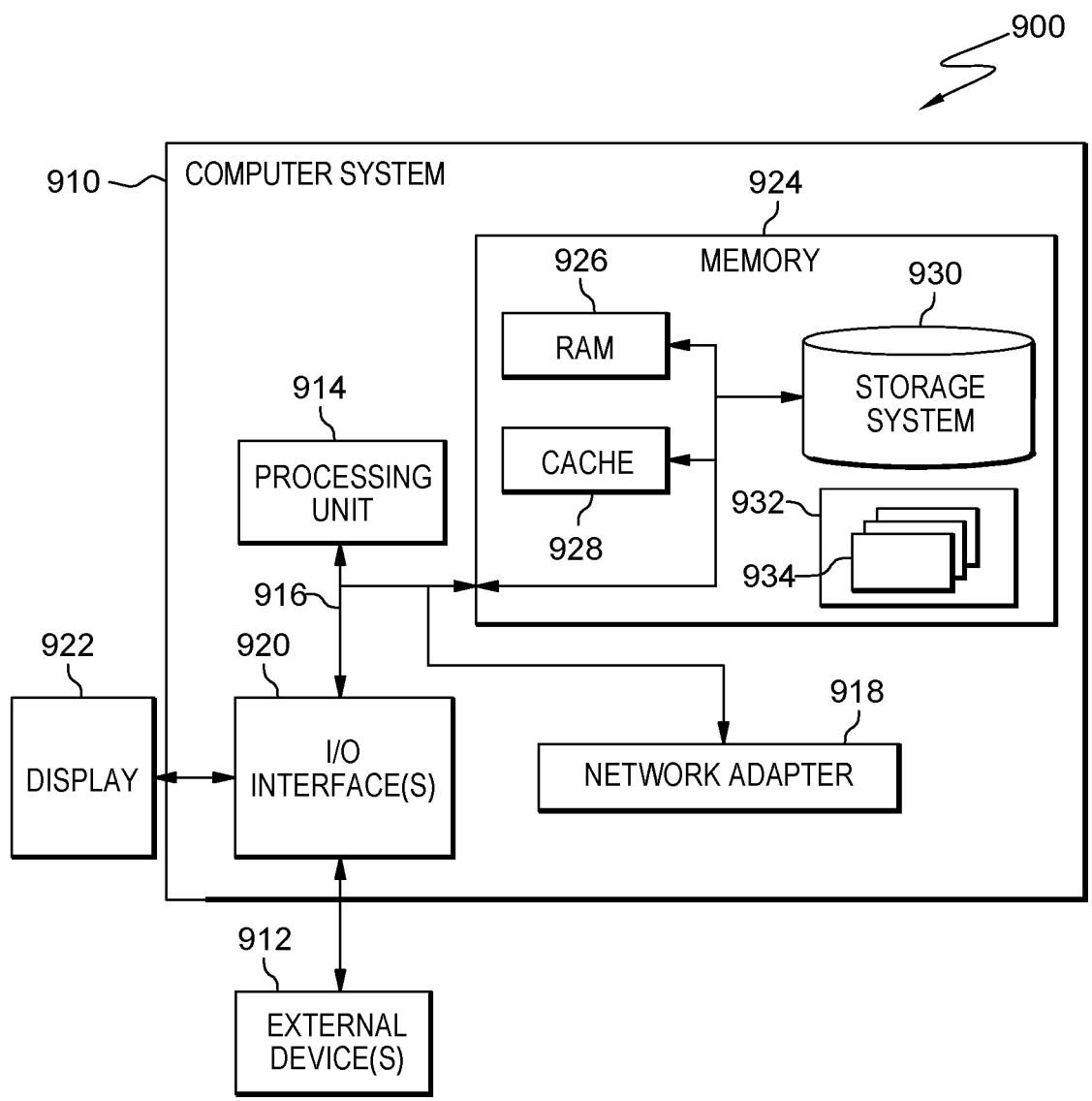
FIG. 9 illustrates a block diagram depicting components of a data processing system, in accordance with an embodiment of the present invention.

FIG. 9 is a block diagram, generally designated 900, depicting components of computing system, such as a server computer (e.g., host computer) interconnected with data storage library 10 of FIG. 1, in accordance with an embodiment of the present invention. It should be appreciated that FIG. 9 provides only an illustration of one implementation and does not imply any limitations with regard to the environments in that different embodiments may be implemented. Many modifications to the depicted environment may be made.

In the illustrative embodiment, the host computer is shown in the form of a general-purpose computing device, such as computer system 910. The components of computer system 910 may include, but are not limited to, one or more processors or processing unit(s) 914, memory 924 and bus 916 that couples various system components including memory 924 to processing unit(s) 914.

Bus 916 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 910 typically includes a variety of computer system readable media. Such media may be any available media that is accessible by computer system 910 and it includes both volatile and non-volatile media, removable and non-removable media.

Memory 924 can include computer system readable media in the form of volatile memory, such as random access memory (RAM) 926 and/or cache memory 928. Computer system 910 may further include other removable/non-removable, volatile/non-volatile computer system storage media. By way of example only, storage system 930 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 916 by one or more data media interfaces. As will be further depicted and described below, memory 924 may include at least one computer program product having a set (e.g., at least one) of program modules that are configured to carry out the functions of embodiments of the invention.

Program/utility 932, having one or more sets of program modules 934, may be stored in memory 924 by way of example and not limitation, as well as an operating system, one or more application programs, other program modules and program data. Each of the operating systems, one or more application programs, other program modules and program data or some combination thereof, may include an implementation of a networking environment. Program modules 934 generally carry out the functions and/or methodologies of embodiments of the invention as described herein. Computer system 910 may also communicate with one or more external device(s) 912, such as a keyboard, a pointing device, a display 922, etc. or one or more devices that enable a user to interact with computer system 910 and any devices (e.g., network card, modem, etc.) that enable computer system 910 to communicate with one or more other computing devices. Such communication can occur via Input/Output (I/O) interface(s) 920. Still yet, computer system 910 can communicate with one or more networks, such as a local area network (LAN), a general wide area network (WAN) and/or a public network (e.g., the Internet) via network adapter 918. As depicted, network adapter 918 communicates with the other components of computer system 910 via bus 916. It should be understood that although not shown, other hardware and software components, such as microcode, device drivers, redundant processing units, external disk drive arrays, RAID systems, tape drives and data archival storage systems may be used in conjunction with computer system 910.

The present invention may be a system, a method and/or a computer program product. The computer program product may include a computer readable storage medium (or media) having computer readable program instructions thereon for causing a processor to carry out aspects of the present invention. In one embodiment, the computer readable storage medium having computer readable program instructions thereon may be internal to a server computer. In another embodiment, the computer readable storage medium having computer readable program instructions thereon may be internal to a server computer. In other embodiments, the computer readable storage medium having computer readable program instructions thereon may be stored external to a server computer, such that a client computer communicates with the server computer through a network connection to execute the computer readable program instructions on data storage library 10.

In another embodiment, the computer readable storage medium having computer readable program instructions thereon may be internal to data storage library 10. In other embodiments, the computer readable storage medium having computer readable program instructions thereon may be stored external to data storage library 10, such that a server computer communicates with data storage library 10 through a network connection to execute the computer readable program instructions on data storage library 10.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. An apparatus for providing data storage protection, the apparatus comprising:
   a data storage library including a deep slot cell configured to house a plurality of tape cartridges, wherein the deep slot cell comprises:
      a front side of the deep slot cell configured to allow insertion and removal of the plurality of tape cartridges by a robotic mechanism;
      a rear air gap at a depth side of the deep slot cell that enables the robotic mechanism to insert a rear-most tape cartridge of the plurality of tape cartridges into the deep slot cell into a position within the rear air gap;
      a front air gap at the front side of the deep slot cell that prevents the robotic mechanism from reaching a front-most tape cartridge of the plurality of tape cartridges without manual interaction; and the depth side of the deep slot cell configured with an opening to accept a pushing tool for manually advancing the rear-most tape cartridge of the plurality of tape cartridges forward toward the front side of the deep slot cell to enable the robotic mechanism to remove the front-most tape cartridge of the plurality of tape cartridges from the deep slot cell.

2. The apparatus of claim 1, wherein the deep slot cell is configured to have a biasing spring mechanism removed from within a housing of the deep slot cell.

3. The apparatus of claim 1, wherein the deep slot cell is configured to have a pusher mechanism removed from within a housing of the deep slot cell, wherein the pusher mechanism is a component of the deep slot cell that includes an integrated biasing spring for automatically advancing forward a rear-most tape cartridge stored within the deep slot cell.

4. The apparatus of claim 1, wherein the robotic mechanism is a gripper assembly integrated within the data storage library.

5. The apparatus of claim 4, wherein the gripper assembly generates a thrust force during a loading operation to push the plurality of tape cartridges into the front air gap at the front side of the deep slot cell far enough to render the front-most tape cartridge inaccessible by the gripper assembly once loaded into the deep slot cell.

6. The apparatus of claim 5, wherein a length of the front air gap of the deep slot cell from the front side of the deep slot cell into a housing of the deep slot cell is determined based, at least in part, on the thrust force generated by the gripper assembly during the loading operation.

7. The apparatus of claim 1, wherein the rear air gap at the depth side of the deep slot cell creates an extended interior space within a housing of the deep slot cell to shift each of the plurality of tape cartridges deeper into the housing of the deep slot cell towards the depth side of the deep slot cell.

8. The apparatus of claim 1, wherein the rear air gap at the depth side of the deep slot cell creates an access space within a housing of the deep slot cell to reach the rear-most tape cartridge of the plurality of tape cartridges with the pushing tool.

9. The apparatus of claim 1, wherein the pushing tool is a hand tool that has an overall fixed length at least equal to a dimension of the deep slot cell as measured from the front side of the deep slot cell to the depth side of the deep slot cell.

10. The apparatus of claim 1, wherein the pushing tool is a telescoping tool capable of extending and locking out at a length at least equal to a dimension of the deep slot cell as measured from the front side of the deep slot cell to the depth side of the deep slot cell.

11. A method for providing data storage protection, the method comprising:
modifying a deep slot cell configured to house a plurality of tape cartridges, wherein modifying the deep slot cell comprises:
creating a rear air gap at a depth side of the deep slot cell that enables a robotic mechanism to insert a rear-most tape cartridge of the plurality of tape cartridges into the deep slot cell into a position within the rear air gap;
creating a front air gap at a front side of the deep slot cell that prevents the robotic mechanism from reaching a front-most tape cartridge of the plurality of tape cartridges without manual interaction; and
creating an opening at the depth side of the deep slot cell to accept a pushing tool.

12. The method of claim 11, wherein modifying the deep slot cell further comprises:
removing a biasing spring mechanism from within a housing of the deep slot cell.

13. The method of claim 11, wherein modifying the deep slot cell further comprises:
removing a pusher mechanism from within a housing of the deep slot cell, wherein the pusher mechanism is a component of the deep slot cell that includes an integrated biasing spring for automatically advancing forward a rear-most tape cartridge stored within the deep slot cell.

14. The method of claim 11, wherein the robotic mechanism is a gripper assembly integrated within a data storage library, and wherein the gripper assembly generates a thrust force during a loading operation to push the plurality of tape cartridges into the front air gap at the front side of the deep slot cell far enough to render the front-most tape cartridge inaccessible by the gripper assembly once loaded into the deep slot cell.

15. The method of claim 11, further comprising:
determining a length of the front air gap of the deep slot cell from the front side of the deep slot cell into a housing of the deep slot cell based, at least in part on, a thrust force generated by a gripper assembly during a loading operation.

16. The method of claim 11, wherein creating the rear air gap at the depth side of the deep slot cell further comprises:
creating an extended interior space within a housing of the deep slot cell to shift each of the plurality of tape cartridges deeper into the housing of the deep slot cell towards the depth side of the deep slot cell.

17. The method of claim 11, wherein creating the rear air gap at the depth side of the deep slot cell further comprises:
creating an access space within a housing of the deep slot cell to reach the rear-most tape cartridge of the plurality of tape cartridges with the pushing tool.

18. The method of claim 11, wherein the pushing tool is a hand tool that has an overall fixed length at least equal to a dimension of the deep slot cell as measured from the front side of the deep slot cell to the depth side of the deep slot cell.

19. The method of claim 11, wherein the pushing tool is a telescoping tool capable of extending and locking out at a length at least equal to a dimension of the deep slot cell as measured from the front side of the deep slot cell to the depth side of the deep slot cell.

20. A computer system for tape library data protection, the computer system comprising:
one or more computer processors;
one or more computer readable storage media; and
program instructions stored on at least one of the one or more computer readable storage media for execution by at least one of the one or more computer processors, the stored program instructions comprising:
program instructions to modify a deep slot cell configured to house a plurality of tape cartridges, wherein the program instructions to modify the deep slot cell further comprise:
program instructions to create a rear air gap at a depth side of the deep slot cell that enables a robotic mechanism to insert a rear-most tape cartridge of the plurality of tape cartridges into the deep slot cell into a position within the rear air gap;
program instructions to create a front air gap at a front side of the deep slot cell that prevents the robotic mechanism from reaching a front-most tape cartridge of the plurality of tape cartridges without manual interaction; and program instructions to create an opening at the depth side of the deep slot cell to accept a pushing tool.

\* \* \* \* \*